Patented Dec. 9, 1941

2,265,776

UNITED STATES PATENT OFFICE 2,265,776

BALATALIKE PRODUCT

James A. Merrill, Akron, Ohio, assignor to Wingfoot Corporation, Wilmington, Del., a corporation of Delaware No Drawing. Application August 31, 1937, Serial No. 161,800

3 Claims. (Cl. 260—727)

This invention relates to novel and distinctive compositions of matter. More particularly, it relates to a product prepared by compounding balata or balata-like material with rubber.

Rubber is often added to balata and like materials for the purpose of variously modifying their physical characteristics. The product so formed is in many instances used as a simple blend while in others it is subjected to vulcanization. In the usual method of incorporating the rubber by adding crude rubber to the balata or balata-like material on a mill there is a limit to the quantity of rubber which may be incorporated while retaining the desirable properties of the balata and obtaining the proper degree of hardness and resilience in the final product.

According to the present invention, large amounts of rubber may be added while retaining the desirable properties of the balata and at the same time adding certain desirable qualities to the finished compound. It is advantageous from several standpoints to add as large an amount of rubber as possible. In the first place the cost of the finished product is reduced. In the second place, in such a mix while the balata lends hardness and moldability the toughness and resilience of the material depend principally upon the rubber content.

It has been suggested to add disintegrated vulcanized rubber in the form of small pieces to balata with the principal idea of obtaining an outlet for scrap vulcanized rubber. The uses of such a product, however, are limited. It is difficult to obtain a completely satisfactory degree of subdivision of such rubber and the rubber when derived from cured scrap varies greatly in characteristics and quality. For both of these reasons the product so prepared is not subject to ready control of quality. In addition, the particle size of the rubber as ordinarily obtained places a limitation on the degree of homogeneity which may be obtained and the structure of the finished products and limits the uses to which the product may be applied.

According to the present invention, the rubber is added not in the form of crude rubber or as ground scrap but is prepared from latex in the form of a fine vulcanized soft rubber powder or dust. This rubber powder may be prepared by any of the well known methods of preparing such products as by spraying, flocculating, etc. The powder, when obtained, is dispersed in the balata or balata-like material by milling or other similar means. By this procedure a product is obtained which consists of very fine discrete particles of vulcanized soft rubber dispersed throughout the balata. Such a composition possesses much of the resilience and toughness of rubber, particularly as present in a rubber derived from latex, while largely retaining the hardness of the external phase of the balata-like material. The hardness of a compound so prepared is considerably greater than would be one made by milling the same amount of crude rubber into balata and curing the mix. Also, if by the conventional method about 40–50 parts of crude rubber are milled into 100 parts of balata and the product is cured, a hardness is obtained which is the equivalent of that of a product obtained according to the invention by adding 100 parts of cured rubber powder. Since, as previously indicated, the toughness of the finished stock depends largely on the amount of rubber present, this new product is tougher than one obtained by the conventional method of milling in crude rubber, each being compounded to give the same hardness. Also, as before stated, because of the relation between costs of balata and rubber it is of economic advantage to incorporate as much rubber as possible. By using cured rubber powder derived from latex, superlative products of outstanding physical characteristics are obtained.

The following example is a typical formula in which the practice of the invention proves efficacious.

Formula I

| | Parts by weight |
|---|---|
| Purified balata | 100 |
| Titanium dioxide | 15 |
| 60 mesh cured soft rubber powder derived from latex | 100 |

Such a compound may be prepared by milling the pigment and rubber powder into the balata on a conventional rubber mill. It is a readily moldable, tough, leather-like material suitable for application to many purposes. When it is used in place of the usual balata compound as a golf ball cover, the cover has outstanding resilience and toughness and at the same time the required hardness.

Instead of the balata of the foregoing example, various other balata-like products may be employed. Materials having physical properties similar to balata and useful as substitutes therefor may be prepared from various condensation derivatives of rubber by proper compounding. Suitable rubber derivatives are prepared by treating rubber with chlorostannic acid, chlorides of amphoteric metals such as tin, iron, aluminum, etc., or various sulfonic acids. One of these derivatives which is very useful is the condensation product derived from rubber by treating it according to U. S. Patent No. 2,052,423 to Sebrell. The following formula demonstrates the practice of the invention when used with such material.

*Formula II*

| | Parts by weight |
|---|---|
| Chlorostannic acid reaction product of rubber prepared according to U. S. Patent No. 2,052,423 | 75 |
| Pale crepe rubber | 25 |
| 60 mesh cured soft rubber powder derived from latex | 30 |

Pale crepe rubber in this formula acts principally as a plasticizer for the rubber condensation product. These two materials are blended on a rubber mill and the rubber powder is then incorporated. The final product is a tough, leather-like material similiar to that obtained using balata in Formual I.

Any other balata-like material may also be employed as, for example, gutta percha.

Other compounding ingredients may be added to impart the desired characteristics to the mix. Thus, plasticizers such as uncured rubber, oils, waxes, etc., may be used as may also other modifying materials such as glue, shellac, resins, etc. As shown in Formula I pigments may also be added when desired. These materials, when added, become part of the external phase and serve to modify the properties of the balata-like material. The internal phase, consisting of the finely divided cured rubber particles, is generally substantially unaffected.

Also, if desired, sulfur or other vulcanizing ingredients, and accelerators may be added. The product may then be vulcanized during or after molding to yield a material comprising discrete vulcanized soft rubber particles dispersed in vulcanized balata or balata-like material. In many cases, however, satisfactory results are obtained without this treatment, the product then being soft vulcanized rubber particles dispersed in unvulcanized balata or balata-like material.

The rubber powder employed may be any cured rubber powder or dust derived from latex so compounded as to yield on vulcanization a soft rubber. It may be prepared by any of the well known methods for manufacturing such powders. The following procedure is illustrative:

To 2750 cc. of 40% Revertex were added 2500 cc. of water, 600 grams of a 10% solution of casein in sodium hydroxide, 20 grams of sulfur dispersed in 10 cc. of water, and 20 grams of zinc oxide and 10 grams of zinc di(dibutyl dithiocarbamate) dispersed in 30 cc. of water. These ingredients were thoroughly mixed and to the mixture was added a solution of 42.5 grams of aluminum chloride in 6000 cc. of water. The flocculent precipitate of rubber which formed was filtered to obtain a moist cake of cheese-like consistency. This cake was crumbled to a fine powder and dried. The powdered rubber product was vulcanized by heating to 100° C. for two hours. Sifting through a series of screens showed that 69 grams were larger than 20 mesh, 377 grams were 20–32 mesh, 510 grams were 32–60 mesh, and 160 grams were finer than 60 mesh.

The particle size may vary over a wide range although in general the fine powders will be preferred as they can be better incorporated and produce smoother mixes more nearly approximating homogeneity. While in some instances larger powders may be used, in general it will be desirable that the powder will pass through a 50–60 mesh screen. In the preparation of material to be used for golf ball covers, it will be desirable that the powder will pass through a 50 mesh screen and that most of the particles will be 100 mesh or finer. The products are especially valuable for application as covers for golf balls, as leather substitutes, and for many applications where a tough, resilient material possessing much of the chemical resistance of balata is desired.

Although only the preferred embodiments of the invention have been described in detail, it will be apparent to those skilled in the art that various modifications may be made therein without departing from the spirit of the invention or the scope of the appended claims.

What I claim is:

1. A new composition of matter comprising an external phase consisting of balata and an internal phase, distributed therethrough, consisting of discrete particles of a vulcanized soft rubber powder directly derived from latex, substantially all of which powder will pass through a 50 mesh screen and most of which will pass through a 100 mesh screen.

2. A new composition of matter comprising an external phase consisting of a material selected from the group consisting of balata and gutta percha and an internal phase, distributed therethrough, consisting of discrete particles of a vulcanized soft rubber powder directly derived from latex, substantially all of which powder will pass through a 50 mesh screen and most of which will pass through a 100 mesh screen.

3. A new composition of matter comprising an external phase consisting of gutta percha and an internal phase, distributed therethrough, consisting of discrete particles of a vulcanized soft rubber powder directly derived from latex, substantially all of which powder will pass through a 50 mesh screen and most of which will pass through a 100 mesh screen.

JAMES A. MERRILL.